United States Patent [19]
Loughlin
[11] 3,842,196
[45] Oct. 15, 1974

[54] SYSTEM FOR TRANSMISSION OF AUXILIARY INFORMATION IN A VIDEO SPECTRUM

[75] Inventor: Bernard D. Loughlin, Centerport, N.Y.
[73] Assignee: Hazeltine Research, Inc., Chicago, Ill.

[22] Filed: Nov. 12, 1973
[21] Appl. No.: 415,202

Related U.S. Application Data
[63] Continuation of Ser. No. 302,333, Oct. 30, 1972, abandoned.

[52] U.S. Cl. .................. 358/12, 178/5.6, 178/5.8 R, 178/DIG. 23, 179/15 BM, 179/15 BW, 325/139
[51] Int. Cl. .......................... H04n 7/08, H04n 9/00
[58] Field of Search ............... 178/5.2 R, 5.4 R, 5.6, 178/5.8 R, DIG. 23; 179/15 BM, 15 BT; 325/139

[56] References Cited
UNITED STATES PATENTS

| | | | |
|---|---|---|---|
| 2,982,813 | 5/1961 | Hathaway | 178/5.6 |
| 3,061,669 | 10/1962 | Leek | 178/DIG. 23 |
| 3,617,892 | 11/1971 | Hawley et al. | 325/139 |
| 3,700,793 | 10/1972 | Borsuk et al. | 178/DIG. 23 |

FOREIGN PATENTS OR APPLICATIONS

| | | | |
|---|---|---|---|
| 4,532,491 | 10/1970 | Japan | 178/DIG. 23 |

*Primary Examiner*—Robert L. Richardson

[57] ABSTRACT

Described is a system for compatibly transmitting and receiving both a color TV and an add-on signal within the frequency band normally occupied by the TV signal alone. To reduce mutual interference between the two signals the system utilizes an add-on signal whose frequency is preferably between the normal location of the luminance and chrominance frequencies of the TV signal. To further reduce such interference the add-on signal is intentionally made redundant and of an opposite polarity during pairs of time successive line intervals, so that when the received combined signal is detected and displayed in a conventional TV receiver the add-on information tends to visually cancel in the displayed image. In order to reliably and accurately recover the add-on information, processing means are included for accepting the received combined signal and causing the redundant add-on information contained therein to reinforce while at the same time causing any redundant video information contained therein to tend to cancel, thus providing an output signal primarily representative of the add-on information.

20 Claims, 6 Drawing Figures

SYSTEM FOR TRANSMISSION OF AUXILIARY INFORMATION IN A VIDEO SPECTRUM

This is a continuation of application Ser. No. 302,333, filed Oct. 30, 1972 and now abandoned.

BACKGROUND OF THE INVENTION

This invention relates to color TV add-on systems and more particularly to those in which a color TV signal and an add-on signal are transmitted and received within the same frequency band. Such systems are highly desirable for both commercial and military applications since instead of consuming valuable and limited frequency spectrum space for the transmission of signals having a desired information content (herein called add-on signals) these systems transmit the add-on signals within the frequency band already occupied by the color TV signal alone.

In order to construct a practical add-on system of this type interference between the add-on signal and the color TV signal must be minimized so as to prevent degradation of the video information carried by the TV signal and yet allow the add-on signal to be transmitted and received accurately and at a sufficiently high data rate to be useful in conveying the intended information. In the prior art such systems have employed basic and well known techniques to achieve this objective, however, the systems have all contained one or more serious drawbacks which heretofore has prevented an add-on system from becoming a commercially practical and workable TV system.

The first of these prior art approaches is to time sequence the add-on information and the video information so that information containing portions of one signal never occur concurrently with information containing portions of the other. One example of this type of system is a system wherein the add-on signal contains information which occurs only during blanking intervals of the TV signal. There are several obvious disadvantages in these time sequencing systems, the most important of which is that due to the spacing and relatively short duration of these blanking intervals the amount of add-on information that can be transmitted per unit of time (i.e., the data rate) is severely limited by the blanking interval rate. A second problem is modern commercial TV applications is that there are several other proposed uses for the vacant area in the horizontal blanking interval any one of which if adopted may preclude this type of add-on system entirely.

Another time sequencing approach is illustrated in Richard Norman Jackson et al's U.S. Pat. No. 3,456,071 entitled "Information Transmission System" in which entire frames of the TV signal are replaced with frames of an unrelated image representative signal which is separately detected and displayed in a remote receiver. This system like the above one, suffers from severe data rate limitation, and is further undesirable because the replacement of TV frames will cause substantial interference in the normal TV channels.

The second prior art technique involves a frequency interleaving of the add-on and TV signals such as shown in J. L. Hathaway's U.S. Pat. No. 2,982,813. This type of system involves a signal carrier (in this case containing sound information) located at a region in the frequency spectrum of the TV signal which is substantially unoccupied (due to the fact that the original image is periodically scanned in lines and fields, thus causing a majority of the TV's signal components to be centered about harmonics of the line scanning rate with substantially unoccupied regions therebetween). The major difficulty with this type of system, as expressly stated in the Hathaway patent, is reducing the interference between the two signals. Hathaway and other systems of this type transmit their additional signal having a relatively high amplitude with respect to the TV signal components in this portion of the frequency band. This may insure reliability in the transmission of the additional signal but has the highly undesirable effect of noticeably degrading the TV signal since the high amplitude interfering signal will be visible in the displayed image. Furthermore, and also as stated in Hathaway, a lower amplitude additional signal located in this same region would be substantially obscured by the TV signal components located in this portion of the frequency band thus diminishing the accuracy and reliability with which Hathaway's additional signal could be transmitted.

It is therefore the object of applicant's invention to overcome the aforementioned prior art problems by providing an add-on system in which an add-on signal can be accurately and compatibly transmitted and received with a color TV signal, in the frequency band normally occupied by the TV signal alone.

It is a further object of the invention to provide such a system in which add-on information contained in the add-on signal occurs concurrently with video information contained in the TV signal and yet both signals are reliably and accurately detected with a minimum of mutual interference therebetween.

It is a still further object of the invention to provide such a system in which the add-on signal is transmitted at a relatively high data rate and on a substantially continuous basis throughout TV signal transmission.

In accordance with the invention there is provided a system for compatibly transmitting and receiving both a TV signal and an add-on signal within the frequency band occupied by the TV signal alone. The system includes means for supplying a TV signal occupying a predetermined frequency band and containing video information occurring during time successive line intervals and means for generating an add-on signal located within a selected portion of said frequency band. The add-on signal has a selected polarity during portion of alternate ones of the line intervals and has an opposite polarity during like portions of remaining line intervals. The add-on signal also contains one element of add-on information for each alternate line interval portion which is identically repeated during the remaining like line interval portion. In this manner the add-on signal is intentionally made redundant and of an opposite polarity during pairs of time successive line interval portions. The system further includes means for combining and transmitting both the add-on and the TV signal and means for receiving the combined signal, whereby the intentionally redundant and opposite polarity add-on information tends to visually cancel during the pairs of line interval portions when the combined signal is displayed. Finally included is means responsive to the received combined signal for processing the signal during pairs of line interval portions to cause redundant video information therein to tend to cancel and redundant add-on information elements therein to reinforce, thereby developing an output signal primarily representative of the add-on information and occurring at a rate of one add-on element for each pair of line interval portions employed.

For a better understanding of the present invention, together with other and further objects thereof, reference is had to the following description, taken in connection with the accompanying drawing, while its scope will be pointed out in the appended claims.

DESCRIPTION AND OPERATION OF THE EMBODIMENT OF FIG. 1

Figure 1:
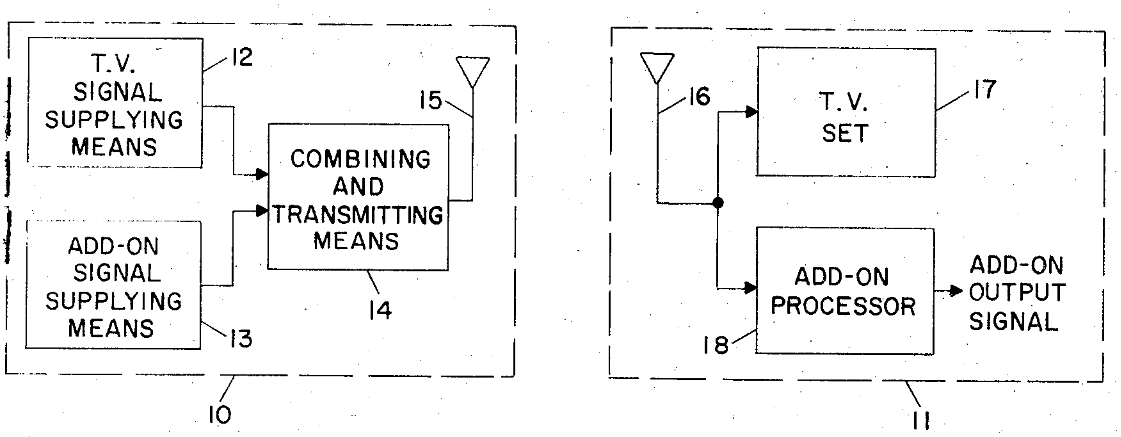
FIG. 1 is a block diagram illustrating an embodiment of invention.

FIG. 1 is a block diagram of a basic add-on color TV system built in accordance with the teachings of the invention. The system includes a transmitter portion 10 which transmits a combined add-on and TV signal to a receiver portion 11, in which the signal is processed to produce a conventional TV picture and additionally processed to provide an output add-on sgnal. While the system is designed to operate in an environment where color TV signals are being transmitted, those skilled in the art will recognize that the concepts discussed are equally applicable to a black and white TV transmission system.

Figure 2:
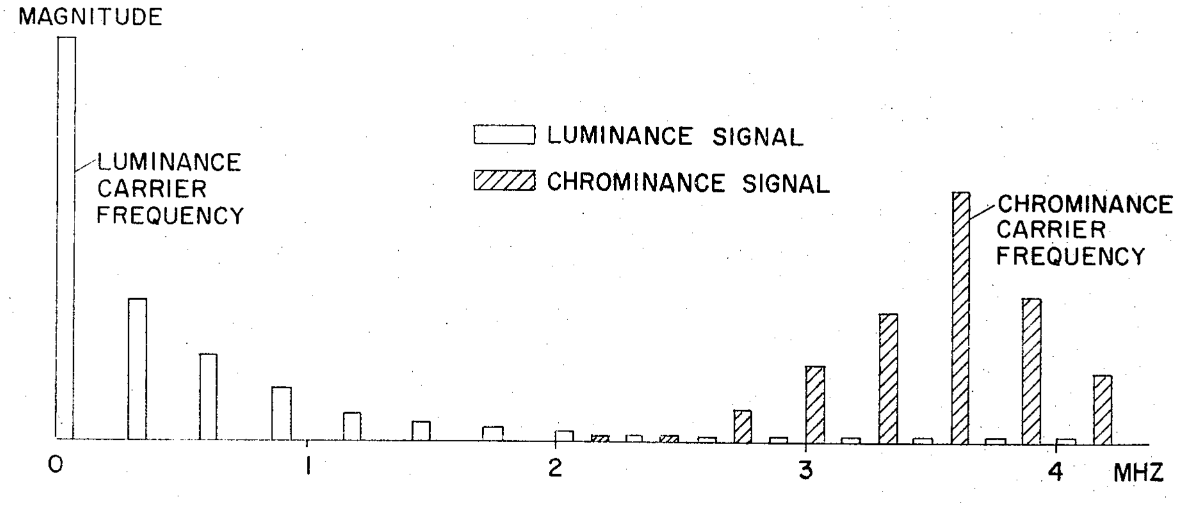
FIG. 2 is a graphical illustration of the energy distribution of a typical TV signal.

More specifically within transmitter portion 10 there is included means 12 for supplying a color TV signal occupying a predetermined frequency band. This signal may be a conventional NTSC or PAL composite color TV signal which includes a luminance signal, having luminance information modulated on a luminance carrier frequency and a chrominance signal having chrominance information modulated on a chrominance carrier frequency. The two signal (luminance and chrominance) are combined to form a composite color TV signal which contains video information occurring during time successive line intervals (i.e., horizontal line intervals) separated by blanking intervals (horizontal and vertical blanking). One particular characteristic of this type of signal is illustrated in FIG. 2, namely, the energy distribution of the signal over the frequency band for a portion of an NTSC type TV signal. Plots of this type and the theory behind them are illustrated at page 129 of the book "Principles of Color TV" edited by Knox McIlwain and Charles Dean. It can be seen from the graph that the luminance components of the color TV signal occur in bunches centered about the harmonics (not all of which are shown) of the frequency at which the time successive line intervals occur (i.e., the horizontal line rate: $f_h$). Furthermore the chrominance components, being modulated on a carrier frequency which is an odd multiple of one-half $f_h$, are interleaved in the gaps between the luminance components thus reducing interference between the two signals. It will also be noted that between the normal location of the luminance and chrominance frequencies, for example there is a portion of the frequency band which contains comparatively low amplitude color TV signal components. In the illustration of FIG. 2 which portrays an NTSC type signal, this portion is approximately between 1 and 3 MHz, and preferably in the area between 1 and 2.5 MHz, but it will be recognized that different color TV systems will have different ranges for such low energy portions. For example, in a PAL TV system a corresponding low energy portion may be between approximately 1 and 4 MHz. It is in such low energy portion of the color TV signal frequency band that the add-on signal herein described is preferably transmitted in order to minimize interference between the add-on and color TV signals.

Referring again to FIG. 1, in transmitter portion 10 there is further included means 13 for generating an add-on signal located in a selected low energy portion of the color TV signal frequency band. This add-on signal is then supplied to a transmitter 14 for combination with the TV signal and transmission through antenna 15 to remote receiver portion 11 where it will be received by antenna 16 and displayed on a display device 17 (a conventional color TV receiver). In its simplest form transmitter portion 10 may include an existing color TV transmission system modified to accept the additional add-on signal. Alternatively transmitter portion 10 may include separate transmitters for the add-on signal and the color TV signal so that the combining of these signals takes place in the medium of transmission (air, cable, etc.).

In order to minimize mutual interference between the add-on and color TV signals, means 13 generates the selected add-on signal having specific characteristics, one of which is the location of the signal in the color TV signal frequency band previously mentioned. In accordance with the present invention second important and unique characteristic is intentional redundancy of the add-on signal during pairs of time successive line intervals, which prevents the add-on signal from noticeably degrading the displayed color TV image and also to insures accurate and reliable detection of the add-on signal itself even if it is transmitted at a relatively low amplitude with respect to the color TV signal components in this portion of the color TV signal frequency band.

To achieve this intentional redundancy, the add-on signal is generated having a given polarity during portions of alternate time successive line intervals and the signal is repeated with an opposite polarity during like portions of the remaining line intervals. This intentional redundancy causes a substantial amount of the add-on information to be visually cancelled in the displayed color TV image, since the human eye when viewing a displayed image made up of a series of lines tends to average the information contained on one line with the information contained on the next line, causing opposite polarity information therein to be effectively cancelled.

Figure 3:
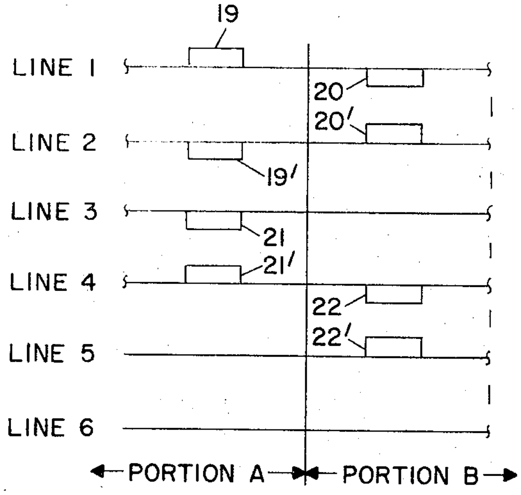
FIG. 3 is a graphical illustration of an intentionally redundant add-on signal in accordance with the invention.

This intentional redundancy can best be understood by referring to FIG. 3 which illustrates a series of time successive horizontal line intervals such as found in a typical color TV signal, although video information which occurs during these line intervals is omitted. (Note that while the lines are labeled 1, 2, 3, etc. these numbers refer only to the time sequence of the lines and are not intended to correspond to the actual numbering of the interlaced horizontal lines as they appear on the TV screen). The line intervals for purposes of simplicity of description may be divided into two series, one of which is arbitrarily called alternate line intervals (for example lines 1, 3 and 5, etc.) and the second of which is called remaining line intervals (lines 2, 4 and 6, etc.). For each alternate line interval there is a corresponding time successive remaining line interval and any two time successive line intervals comprises a line interval pair (for example lines 1 and 2). These line intervals (and therefore the line interval pairs) may be further broken down into one or more line interval portions according to the amount of information it is desired to transmit during any given line interval. In FIG. 3, for each alternate line interval there are two line interval portions (portions A and B) and therefore for each line interval pair there are two pairs of line interval portions. During any alternate line interval portion (for example line 1, portion A) the add-on signal may include an element of add-on information such as the pulse 19. In order to achieve intentional redundancy then, this pulse is identically repeated (pulse 19') during the like portion of the next time successive line interval (i.e., portion A of line 2) except with an opposite polarity. This same process is repeated with pulse 20 and 20' for the pair of line intervals 1 and 2 in portion B.

Of course, variations of the format illustrated in FIG. 3 above will be apparent to those skilled in the art. For example, a complete alternate line interval need not be intentionally redundant with respect to the entire remaining line interval. As illustrated in FIG. 3, only portion A of line interval pair 3 and 4 contains intentionally redundant and opposite polarity add-on information elements, while similarly only portion B of line interval pair 4 and 5 contains such information. (See pulses 21, 21' and 22, 22').

To obtain maximum data rate it would be desirable to generate an add-on signal having as many add-on elements as possible and therefore as many line interval portions during any line interval as possible. However, it will be recognized that transmission of only one add-on information element per line interval is sufficient to provide a high enough data rate for many applications. For example, in a conventional NTSC system, there are approximately 15,750 line intervals per second. Thus, 15,750 add-on information elements per second can be transmitted at the rate of one element per line interval. This in turn will provide 7,875 distinct bits per second of add-on information, due to the intentional redundancy introduced in accordance with the present invention.

It will be recognized that many useful ways of generating an add-on signal in accordance with the invention exist. Such signals may be generated through biphase modulation of a carrier, frequency hopping techniques, linear or nonlinear frequency modulation, or any other carrier modulation technique, so long as the add-on signal developed is within the selected portion of the TV signals frequency band and contains the requisite intentional redundancy.

The result of this intentional redundancy is that when the combined color TV and add-on signal is received at antenna 16 in receiver 11 and displayed on the conventional color TV receiver 17, the displayed image will contain components due to the add-on signal, but because of the redundancy and opposing polarity of these components they will, when viewed by an individual, tend to cancel out. This renders the effects of the add-on information on the TV signal virtually unnoticeable, and therefore accomplishes one of the objectives of the invention, namely to prevent the add-on signal from interfering with the color TV signal. Of course, if it is desired to receive the add-on signal alone, TV set 17 may be omitted and receiver portion 11 may simply include add-on processor 18.

Turning now to the recovery of the add-on signal itself, there is included in receiver portion 11, means 18 for processing the combined color TV and add-on signal during each pair of line interval portions to cause redundant video information therein to tend to cancel and identical add-on information elements therein to reinforce. Processing means 18 provides an output signal which is primarily representative of the add-on signal and has a data rate which is determined by the number of add-on elements transmitted during each line interval.

AS is well known in the art the video information in color TV signals is substantially redundant on a line to line basis. This factor is used advantageously in processor 18 where just as the redundant add-on components tend to visually cancel in display device 17, the redundant TV components tend to electrically cancel in add-on processor 18. Furthermore, since each add-on element is reinforced with its redundant counterpart, the add-on information is readily distinguishable from any video information which is not cancelled (since video redundancy is not 100 percent), thus achieving a second object of the invention, namely, reliable and accurate detection of the add-on signal even if it is transmitted at a relatively low amplitude with respect to the color TV signal.

Figure 4:
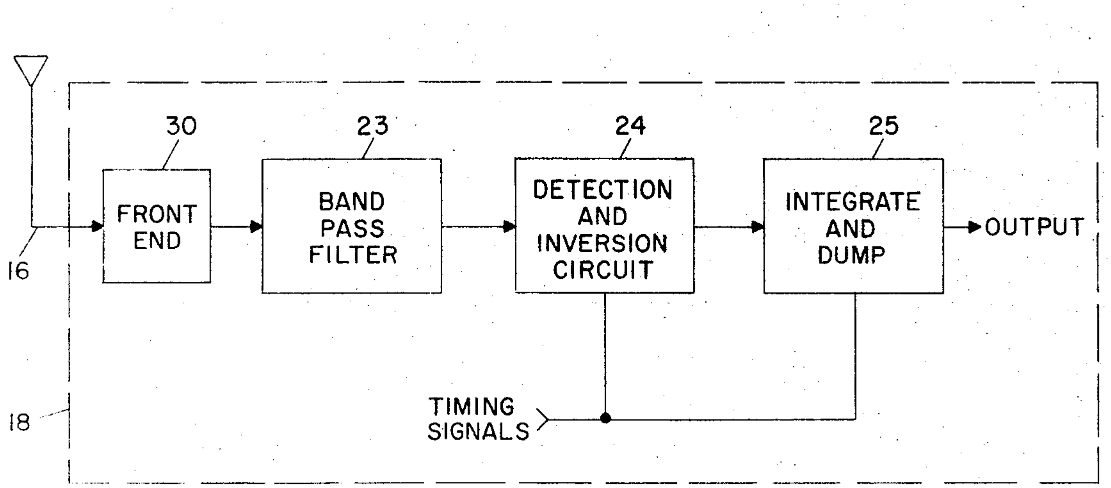
FIG. 4 is a block diagram of an add-on signal processor useful in the embodiment of FIG. 1.

One specific processing means 18 useful in an add-on system wherein only one line interval portion exists for each line interval (an therefore only one add-on element for each line interval) is illustrated in FIG. 4. In this embodiment the received combined color TV and add-on signal is supplied to conventional front end circuitry 30 which in turn supplies a corresponding video frequency signal to a bandpass filter 23 which excludes portions of the color TV frequency band in which the add-on signal does not occur. The filtered signal is then supplied to detection and inversion circuit 24 which detects the add-on signal (and whatever video components are present in this portion of the color TV frequency band) and inverts every other line of the TV signal, thus causing the redundant add-on elements occurring during line interval pairs to have the same polarity and further causing any redundant video information to have opposite polarity during such line interval pairs.

The detection circuit 24 is adapted to detect signals of the type transmitted and therefore if a phase modulation technique is used a different detector may be required than if a frequency hopping transmission technique was employed. The detection and inversion circuitry may be controlled by suitable timing signals such as the horizontal and vertical sync pulses available in the color TV set so that inversion is achieved at the appropriate times. Alternatively and if the TV set were omitted suitable timing signals could be easily developed from the sync signal components of the color TV signal, for example, in a manner well known to the art.

The signal from circiut 24 is then supplied to an integrator 25 which is more accurately described as a conventional integrate and dump circuit. Integrator 20 integrates the detected signal during each line interval pair thus allowing the redundant add-on information elements (which at point are of identical polarity) to reinforce and at the same time causing the opposite polarity redundant video information to tend to cancel. At the end of each line interval pair, integrator 20 dumps the information stored therein and begins to integrate for the next line interval pair. A timing signal, for example horizontal sync pulses, is supplied to integrator 25 to enable integration and dumping to occur at appropriate times in a manner well known in the art. As a result, integrator 25 provides an add-on output signal which contains primarily add-on information occurring at a data rate of one add-on information element for each line interval pair in the color TV signal.

Figure 5:
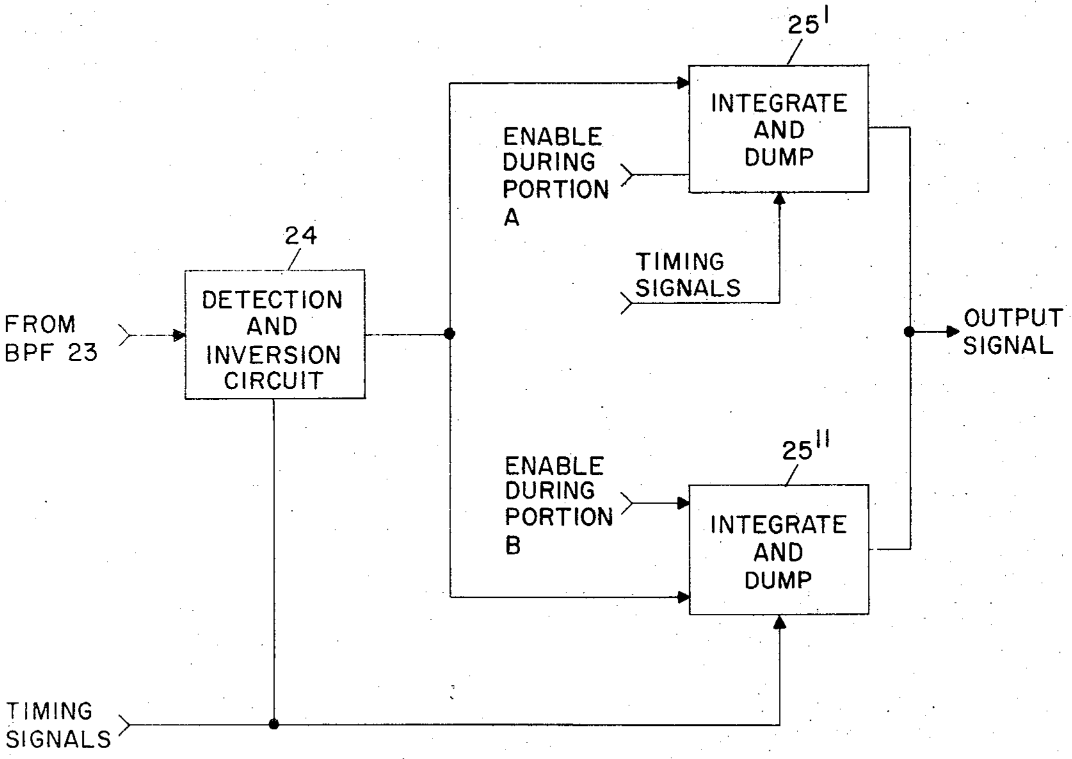
FIG. 5 is an alternate add-on signal processor used in the embodiment of FIG. 1.

As previously stated, if a higher data rate is desired two or more add-on information elements can be transmitted during each line interval (dividing each line interval into line interval portions, as mentioned previously). In this case, however, one integrate and dump circuit should be utilized for each line interval portion with appropriate storage and switching circuitry provided to activate each integrator only during its associated line interval portion. For example FIG. 5 shows an embodiment useful in a system where each line interval contains two portions A and B, such as those illustrated in prior FIG. 3. The circuits preceding detector 24 may be identical to the FIG. 4 embodiment (assuming that entire line intervals are redundant with the entire next successive line interval as in FIG. 3 lines 1 and 2). Integrator 25' is enabled only during portion A of each line interval pair by a suitable enabling signal while integrator 25'' is enabled only during portion B of any line interval pair. The necessary enabling signals may be easily derived from the horizontal sync pulses. Integrator 25' therefore will provide an output which is primarily representative of the add-on information elements transmitted during portion A of each line interval pair and integrator 25'' will provide an output primarily representative of the add-on information element transmitted during portion B of each line interval pair. These two outputs may then be combined to provide a final output signal representative of all of the add-on information elements transmitted, and in this case having a data rate of two add-on information elements per line interval pair in the received signal.

DESCRIPTION AND OPERATION OF THE EMBODIMENT OF FIG. 6

Figure 6:
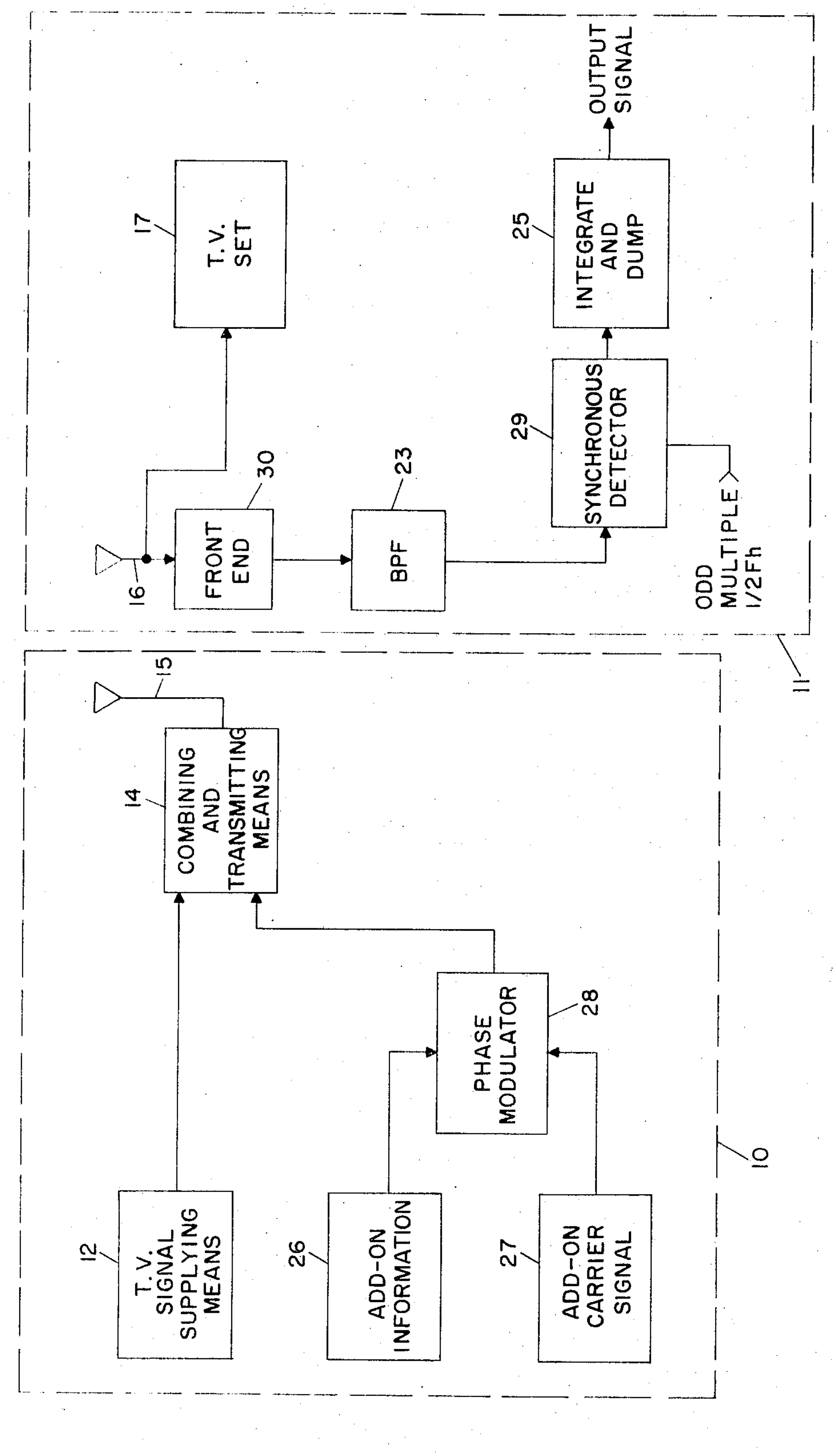
FIG. 6 is a block diagram of a specific add-on TV signal transmitter and receiver especially useful for commercial applications.

In FIG. 6 there is shown a specific embodiment of the invention especially useful in conjunction with present commercial color TV systems. In transmitter portion 10 there is included color TV signal supplying means 12, transmitter 14 and antenna 15 which may be identical to the like numbered elements in the FIG. 1 embodiment. Also included in transmitter portion 10 is means 26 for supplying add-on information elements. These elements may be binary pulses of information such as illustrated in FIG. 3 or elements in any other convenient format suitable for modulating an add-on carrier signal utilizing any well known modulation technique. As previously stated they may occur at a rate of one or more elements per line interval of the color TV signal. However, for purposes of simplicity in this description they will be considered as occuring at the rate of one add-on information element per line interval. Further included transmitter portion 10 is means 27 for supplying an add-on carrier signal and a phase modulator 28 for phase modulating the carrier with the supplied add-on information elements, thus creating at the output of modulator 28 the requisite add-on signal which is supplied to transmitter 14.

It will be recognized that in order to derive an add-on signal having add-on information elements which are intentionally redundant and of opposite polarity during a pair of time successive line intervals different configurations of the units 26, 27 and 28 can be employed. For example, means 26 could simply supply a first add-on element of a given polarity during a first line interval and an identical add-on element of an opposite polarity during the next line interval, thus creating the requisite intentional redundancy and opposite polarity. Alternatively, means 26 could supply identical add-on information elements of the same polarity during two successive line intervals. In this case means 27 could include a phase shifter which during every other line interval would shift the phase of the carrier frequency, thus creating at the output of phase modulator 28 a signal which has the necessary intentional redundancy and opposite polarity. A third approach would be to have means 26 supply identical add-on information elements of the same polarity during two successive line intervals and then have means 27 supply a carrier signal of a continuous phase. Then the signal generated by phase modulator 28 could be phase inverted during every other line interval, thus creating the same effect as the previous two examples.

One particular method that is especially simple is to have means 27 supply a carrier signal which is an odd multiple of one-half of the frequency at which the time successive line intervals occur (i.e., $f_h$), and to allow means 26 to supply for each time interval pair two identical add-on information elements which have the same polarity. The resultant output signal from phase modulator 28 contains redundant add-on information elements during any pair of time successive line intervals. However, because of the selection of the add-on carrier frequency, when this add-on signal is combined in transmitter 14 with the color TV signal and transmitted from antenna 15 the add-on signal received at unit 11 will have the requisite characteristics, namely, intentional redundancy and opposite polarity during pairs of time successive line intervals as will be apparent from the following description of receiver portion 11.

As in the FIG. 1 embodiment the combined add-on and color TV signal is received by antenna 16 and supplied to a conventional color TV receiver 17. Since the add-on signal is modulated on a carrier signal which is an odd multiple of one-half $f_h$, the identically repeated add-on elements will, when displayed, appear to have opposite polarity during time successive line intervals due to the fact that the TV signal itself is displayed during line intervals which occur at the horizontal line frequency ($f_h$). The visual cancellation of the add-on signal that occurs between the time successive line intervals due to the selection of the add-on carrier frequency is similar to the cancellation that takes place between the luminance signal component of the color TV signal and the chrominance signal component, which is also modulated on a carrier which is an odd multiple of one-half $f_h$. This type of cancellation is more fully explained in the aforementioned book, "Principles of Color TV" at pages 128 through 132.

The received combined signal from antenna 16 is also supplied through bandpass filter 23 similar to the band-pass filter in the FIG. 4 embodiment and the filtered signal is then supplied to a synchronous detector 29 which is responsive to a regenerated add-on carrier signal which, like the original add-on carrier signal, is an odd multiple of one-half $f_h$. In synchronous detector 29 the filtered signal is beat against the regenerated carrier producing a detected signal representative of the information in the filtered signal. In this case, however, it is the color TV signal portions which appear inverted during successive line intervals, since the basic detection scheme has been shifted to a frame or reference relative to the frequency of the add-on carrier signal rather than the TV horizontal line frequency ($f_h$) itself. Therefore the add-on carrier signal elements provided at the output of synchronous detector 29 have the same polarity during time successive line intervals while any redundant TV information has an inverted polarity during pairs of time successive line intervals. When the detected signal is supplied to integrator 25, also indentical to the previously described integrators, the add-on information elements reinforce and any redundant video information tend to cancel and the output signal represents primarily the add-on information.

The above described circuit has many advantages in its simplicity and the fact that it uses many existing TV system components and therefore is comparatively inexpensive to implement. Furthermore, since the add-on channel is relatively independent of the TV signal channel, little or no modification to existing TV systems is required if the add-on system were to be installed. Finally, since the add-on signal is completely compatible with the TV signal, persons not desiring to have add-on capability would not have their TV pictures interfered with by the transmission of the add-on signal to subscribers.

It will be recognized that practicalities may permit some interference to occur in the transmission and detection of signals of the type described herein. For example, it is possible under certain conditions for some add-on information to be detected in the chrominance channel of the TV receiver and for some chrominance information to be detected by the add-on signal processor.

Since the chrominance detector is generally narrow band, however, interference in the chrominance channel, if it does occur, may be easily minimized by suitable positioning of the add-on signal to a lower frequency in the TV signal frequency band and by transmitting the add-on signal with a relatively low amplitude. This positioning of the add-on signal also helps to avoid interference in the add-on channel from the chrominance signal.

The systems described above have many uses, a few of which are pointed out below. One possible use would be for multilanguage TV transmission in which the TV signal would convey the normal picture and sound information, with the add-on signal conveying different language translations. A second possible use would be in the area of educational TV where picture information and questions could be transmitted by the normal TV signal, with answers to the questions could be transmitted by the add-on signal. It will be recognized that many other uses exist for an add-on system and the above uses are presented solely as an example.

While there have been described what are at present considered to be the preferred embodiments of this invention, it will be obvious to those skilled in the art that various changes and modifications may be made therein without departing from the invention.

What is claimed is:

1. A system for compatibly transmitting and receiving both a TV signal and an add-on signal within the frequency band occupied by the TV signal alone, comprising:

means for supplying a TV signal occupying a predetermined frequency band and containing video information occurring during time successive line intervals;

means for generating an add-on signal located within a portion of said frequency band lying between the normal location of the luminance and chrominance carrier frequencies, said add-on signal being of a selected polarity during portion of alternate ones of said line intervals and of an opposite polarity during like portions of remaining line intervals, and said add-on signal containing one element of add-on information for each alternate line interval portion which is identically repeated during the remaining like line interval portion whereby said add-on signal is intentionally made redundant and of an opposite polarity during pairs of time successive line interval portions;

means for combining and transmitting both said add-on and said TV signals;

means for receiving said combined signal, whereby the intentionally redundant and opposite polarity add-on information tends to visually cancel during said pairs of line interval portions when said combined signal is displayed;

and means responsive to said received combined signal for processing said signal during pairs of line interval portions to tend to cause redundant video information therein to cancel and redundant add-on information elements therein to reinforce, thereby developing an output signal primarily representative of said add-on information and occurring at a rate of one add-on element for each pair of line interval portions employed.

2. Apparatus in accordance with claim 1 wherein said processing means includes means, responsive to said received combined signal, for detecting said combined signal and for inverting the polarity of the detected signal during every other line interval, to provide a detected add-on signal in which during pairs of like line interval portions each indentically repeated add-on information element has the same polarity and in which any detected redundant video information has an opposite polarity;

and means, responsive to tend to said detected add-on signal for integrating the add-on signal which occurs during each of said pairs of like line interval portions thereby causing said identical add-on information elements to reinforce and said opposite polarity redundant video information to cancel.

3. Apparatus in accordance with claim 2 wherein said means for generating the add-on signal includes means for generating an add-on signal carrier having a frequency which is an odd multiple of one-half the frequency at which said time successive line intervals occur and means for modulating said add-on signal carrier with selected add-on information consisting of add-on information elements occurring during each alternate line interval portion and an identically repeated add-on information element of the same polarity occurring during a like portion of each remaining line interval;

whereby the frequency of said add-on signal carrier causes the add-on information element in each pair of time successive line interval portions to have opposite polarities when said received combined signal is displayed.

4. A system for compatibly transmitting and receiving both a TV signal and an add-on signal within the frequency band occupied by the TV signal alone, comprising:

means for supplying a TV signal occupying a predetermined frequency band and containing video information occurring during time successive line intervals;

means for generating an add-on signal carrier having a frequency which is an odd multiple of one-half of the frequency at which said time successive line intervals occur;

means for modulating said add-on signal carrier with selected add-on information consisting of add-on information elements occurring during portions of alternate ones of said line intervals and of identically repeated add-on information elements of the same polarity as said original information elements occurring during like portions of the remaining line intervals, to provide an add-on signal located within a portion of said frequency band lying between the normal location of the luminance and chrominance carrier frequencies, whereby said add-on signal is intentionally made redundant and of an opposite polarity during like portions of pairs of time successive line intervals, due to the selection of said add-on signal carrier frequency and the repeating of each add-on information element;

means for combining and transmitting both said add-on and said color TV signals;

means for receiving and displaying said combined signal whereby the intentionally redundant and opposite polarity add-on information tends to visually cancel in the displayed image during said pairs of line interval portions;

a synchronous detector, jointly responsive to said received combined signal and to a supplied regenerated add-on signal carrier, for developing a detected add-on signal representative of said add-on information whereby the frequency of said regenerated add-on carrier causes the identically repeated add-on information elements to have the same polarity and causes any redundant video information in the detected add-on signal to have an opposite polarity;

and means, responsive to said detected add-on signal, for integrating sid signal during each of said pairs of line interval portions to tend to cause redundant video information therein to cancel and identical add-on information elements therein to reinforce, thereby developing an output signal primarily representative of said add-on information and occurring at a rate of one add-on element per pair of line interval portions employed.

5. Apparatus in accordance with claim 4 wherein each line interval is divided into at least two line interval portions, thereby providing said output signal with add-on information occurring at a rate of at least two add-on elements for each pair of line intervals.

6. Apparatus in accordance with claim 5 wherein said integrating means includes one integrator for each pair of line interval portions employed and switching means for activating each of said integrators only during its associated line interval portion to detect any add-on information element occurring therein, and means for combining the outputs of each integrator to provide said output signal.

7. Apparatus in accordance with claim 6 wherein said modulating means comprises a phase modulator jointly responsive to said add-on carrier signal and said selected add-on information for providing a phase modulated add-on signal.

8. A transmitter for use in a system for compatibly transmitting and receiving both a color TV signal and an add-on signal within the frequency band occupied by the color TV signal alone, comprising:

means for supplying a color TV signal occupying a predetermined frequency band and containing video information occurring during time successive line intervals;

means for generating an add-on signal located within a portion of said frequency band lying between the normal location of the luminance and chrominance carrier frequencies, said add-on signal being of a selected polarity during portions of alternate ones of said line intervals and of an opposite polarity during like portions of remaining line intervals, and said add-on signal containing one element of add-on information for each alternate line interval portion, said element being identically repeated during the remaining like line interval portion, whereby said add-on signal is intentionally made redundant and of an opposite polarity during like portions of pairs of time successive line intervals;

means for combining and transmitting both said add-on and said TV signals to develop a signal suitable for reception and detection in a remote receiver in which said TV signal is displayed with a minimum of interference from said add-on signal and in which said add-on signal is detected with a minimum of interference from said TV signal.

9. Apparatus in accordance with claim 8 wherein said means for generating the add-on signal includes means for generating an add-on signal carrier having a frequency which is an odd multiple of one-half the frequency at which said line intervals occur and means for modulating said add-on signal carrier with selected add-on information consisting of an add-on information element occurring during each alternate line interval portion and an identically repeated add-on information element of the same polarity occurring during a like portion of each remaining line interval;

whereby the frequency of said add-on signal carrier causes the add-on information element in each pair of line interval portions to have opposite polarities when said received combined signal is displayed.

10. Apparatus in accordance with claim 9 wherein said modulating means comprises a phase modulator jointly responsive to said add-on carrier signal and said selected add-on information for providing a phase modulated add-on signal.

11. A receiver for use in a system for compatibly transmitting and receiving a TV signal occupying a predetermined frequency band and containing video information occurring during time successive line intervals, which is combined with an add-on signal located within a portion of said frequency band lying between the normal location of the luminance and chrominance carrier frequencies, said add-on signal containing intentionally redundant and opposite polarity add-on information consisting of add-on information elements occurring during portions of alternate ones of said line intervals and identically repeated and opposite polarity add-on information elements occurring during like portions of remaining line intervals, comprising:

means for receiving said combined signal, whereby the intentionally redundant and opposite polarity add-on information tends to visually cancel during said pairs of line interval portions when said combined signal is displayed;

and means, responsive to said received combined signal for processing said signal during pairs of line interval portions to cause redundant video information therein to tend to cancel and redundant add-on information elements therein to reinforce, thereby developing an output signal primarily representative of said add-on information and occurring at a rate of one add-on element per pair of line interval portions employed.

12. A receiver in accordance with claim 11 wherein said processing means includes means, responsive to said received combined signal, for detecting said signal and for inverting the polarity of the detected signal during every other time successive line interval, to provide a detected signal in which during like portions of pairs of line intervals, redundant add-on information elements have the same polarity whereas any redundant video information elements are of opposite polarity;

and means for integrating said detected signal during each of said pairs of like line interval portions thereby causing said redundant add-on information elements to reinforce and said redundant video information elements to cancel.

13. A receiver for use in a system for compatibly transmitting and receiving a combined TV signal occupying a predetermined frequency band and containing video information occurring during time successive line intervals, and an add-on signal located within a portion of said frequency band lying between the normal location of the luminance and chrominance carrier frequencies, said add on signal consisting of add-on information elements occurring during portions of alternate ones of said line intervals, and identically repeated add-on information elements of the same polarity occurring during like portions of remaining line intervals, said elements being modulated on an add-on signal carrier whose frequency is an odd multiple of one-half of the frequency at which said line intervals occur, thus providing an add-on signal which is intentionally redundant and of an opposite polarity during like portions of pairs of time successive line intervals, comprising:

means for receiving and displaying said combined signal whereby the intentionally redundant and opposite polarity add-on information tends to visually cancel in the displayed image during said pairs of line interval portions;

a synchronous detector, jointly responsive to said received combined signal and to a supplied regenerated add-on signal carrier, for developing detected add-on signal representative of said add-on information whereby the use of a regenerated add-on carrier signal, whose frequency is an odd multiple of one-half of the frequency at which said line intervals occur causes, during said pairs of line interval portions, the identically repeated add-on information elements to have the same polarity and causes redundant video information contained in the detected add-on signal to have an opposite polarity;

and means, responsive to said detected add-on signal, for integrating the add-on signal which occurs during each of said pairs of line interval portions to tend to cause redundant video information therein to cancel and identical add-on information elements therein to reinforce, thereby developing an output signal primarily representative of said add-on information and occurring at a rate of one add-on element for each pair of line interval portions employed.

14. Apparatus in accordance with claim 13 wherein there are at least two line interval portions for each line interval, thereby providing said output signal with add-on information occurring at a rate of at least two add-on elements per line interval.

15. Apparatus in accordance with claim 14 wherein said integrating means includes one integrator for each pair of time successive line interval portions employed and switching means for activating each of said integrators only during its associated line interval portion to detect any add-on information element occurring therein, and means for combining the outputs of each integrator to provide said output signal.

16. A system for compatibly transmitting and receiving both a TV signal and an add-on signal within the frequency band occupied by the TV signal alone, comprising:

means for supplying a TV signal occupying a predetermined frequency band and containing video information occurring during time successive line intervals;

means for generating an add-on signal located within a portion of said frequency band, said add-on signal being of a selected polarity during portion of alternate ones of said line intervals and of an opposite polarity during like portions of remaining line intervals, and said add-on signal containing one element of add-on information for each alternate line interval portion which is identically repeated during the remaining like line interval portion whereby said add-on signal is intentionally made redundant and of an opposite polarity during pairs of time successive line interval portions;

means for combining and transmitting both said add-on and said TV signals;

means for receiving said combined signal, whereby the intentionally redundant and opposite polarity add-on information tends to visually cancel during said pairs of line interval portions when said combined signal is displayed;

and means responsive to said received combined signal for processing said signal during pairs of line interval portions to cause redundant video information therein to tend to cancel and redundant add-on information elements therein to reinforce thereby developing an output signal primarily representative of said add-on information and occurring at a rate of one add-on element for each pair of line interval portions employed.

17. Apparatus in accordance with claim 16 wherein said processing means includes means, responsive to said received combined signal, for detecting said combined signal and for inverting the polarity of the detected signal during every other line interval, to provide a detected add-on signal in which during pairs of like line interval portions each identically repeated add-on information element has the same polarity and in which any detected redundant video information has an opposite polarity;

and means, responsive to said detected add-on signal for integrating the add-on signal which occurs during each of said pairs of like line interval portions thereby causing said identical add-on information elements to reinforce and said opposite polarity redundant video information to tend to cancel.

18. A transmitter for use in a system for compatibly transmitting and receiving both a color TV signal and an add-on signal within the frequency band occupied by the color TV signal alone, comprising:

means for supplying a color TV signal occupying a predetermined frequency band and containing video information occurring during time successive line intervals;

means for generating an add-on signal located within a portion of said frequency band, said add-on signal being of a selected polarity during portions of alternate ones of said line intervals and of an opposite polarity during like portions of remaining line intervals, and said add-on signal containing one element of add-on information for each alternate line interval portion, said element being identically repeated during the remaining like line interval portion, whereby said add-on signal is intentionally made redundant and of an opposite polarity during like portions of pairs of time successive line intervals;

means for combining and transmitting both said add-on and said TV signals to develop a signal suitable for reception and detection in a remote receiver in which said TV signal is displayed with a minimum of interference from said add-on signal and in which said add-on signal is detected with a minimum of interference from said TV signal.

19. A receiver for use in a system for compatibly transmitting and receiving a TV signal occupying a predetermined frequency band and containing video information occurring during time successive line intervals, which is combined with an add-on signal located within a portion of said frequency band, said add-on signal containing intentionally redundant and opposite polarity add-on information consisting of add-on information elements occurring during portions of alternate ones of said line intervals and identically repeated and opposite polarity add-on information elements occurring during like portions of remaining line intervals, comprising:

means for receiving said combined signal, whereby the intentionally redundant and opposite polarity add-on information tends to visually cancel during said pairs of line interval portions when said combined signal is displayed;

and means, responsive to said received combined signal for processing said signal during pairs of line interval portions to cause redundant video information therein to tend to cancel and redundant add-on information elements therein to reinforce, thereby developing an output signal primarily representative of said add-on information and occurring at a rate of one add-on element per pair of line interval portions employed.

20. A receiver in accordance with claim 19 wherein said processing means includes means, responsive to said received combined signal, for detecting said signal and for inverting the polarity of the detected signal during every other time successive line interval, to provide a detected signal in which during like portions of pairs of line intervals, redundant add-on information elements have the same polarity whereas any redundant video information elements are of opposite polarity;

and means for integrating said detected signal during each of said pairs of like line interval portions thereby causing said redundant add-on information elements to reinforce and said redundant video information elements to tend to cancel.

* * * * *